P. A. PAINCHAUD.

QUICK DETACHABLE ELASTIC TIRE.

APPLICATION FILED SEPT. 16, 1915.

Reissued Feb. 1, 1916.

14,057.

WITNESS

Chas. F. Clagett

INVENTOR

Pierre Antonio Painchaud

BY W. S. Orton.

ATTORNEY

THE COLUMBIA PLANOGRAPH CO., WASHINGTON, D. C.

UNITED STATES PATENT OFFICE.

PIERRE ANTONIO PAINCHAUD, OF PLESSISVILLE, QUEBEC, CANADA, ASSIGNOR, BY DIRECT AND MESNE ASSIGNMENTS, TO OCTAVE GINGRAS, OF QUEBEC, CANADA.

QUICK-DETACHABLE ELASTIC TIRE.

14,057. Specification of Reissued Letters Patent. Reissued Feb. 1, 1916.

Original No. 1,149,780, dated August 10, 1915, Serial No. 875,728. Application for reissue filed September 16, 1915. Serial No. 51,109.

*To all whom it may concern:*

Be it known that I, PIERRE ANTONIO PAINCHAUD, a subject of the King of Great Britain, and resident of Plessisville, in the Province of Quebec, Canada, have invented certain new and useful Improvements in Quick-Detachable Elastic Tires; and I do hereby declare that the following is a full, clear, and exact description of the same.

The invention is a "quick detachable elastic tire" and the object of the invention is to provide an elastic tire that may be made in standard sizes to be mounted on fellies of ordinary wheels.

A further object of the invention is to provide a tire of this character with a minimum depth consistent with the requisite strength and springiness, in order that the resulting wheel shall have just about the same appearance as an ordinary pneumatic tired wheel.

A still further object is to simplify and thus cheapen the cost of the tire.

The invention consists of a pair of opposing U-sectioned metal bands forming inner and outer rims concentrically arranged and between which the springs to give the necessary resilience, are arranged in a particular manner. The inner rim or band is made of such a size that it will nicely fit the felly of a standard size wheel and is secured thereon by any suitable means. The outer band preferably carries a rubber tread portion and side plates to close in the space between the two rims. The provision of the two U-sectioned bands, not only lessens the depth of the tire, but provides advantageous supports for a plurality of brackets secured in pairs to the inner and outer rim respectively on opposite sides of the wheel, between which the springs are stretched so as to lie in a direction parallel with the axis of the wheel, these springs engaging hooks on the free ends of the brackets so that they may be easily attached or detached.

The invention will be better understood with the aid of the accompanying drawings in which—

Figure 1:
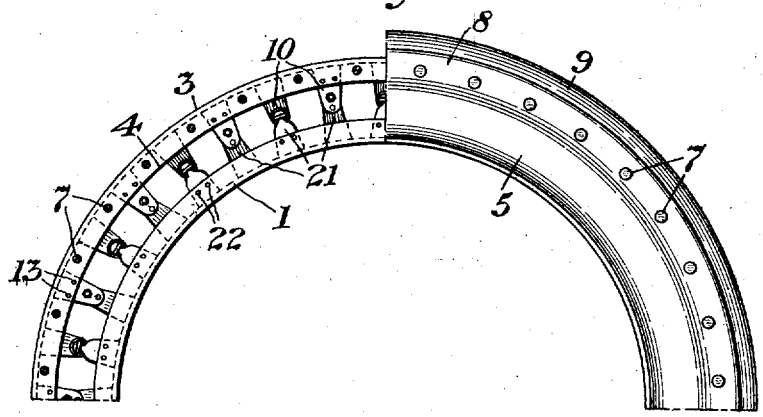
Figure 3:
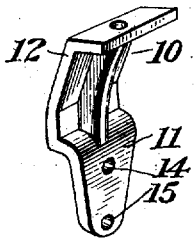
Figure 2:
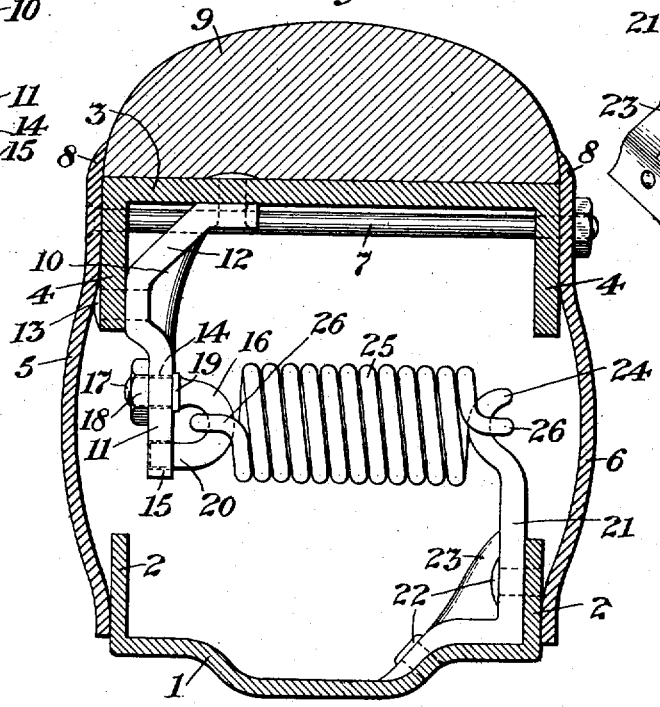
Figure 4:
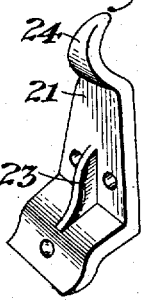

Figure 1 is a side view of a portion of the elastic tire according to the present invention, partly in elevation and partly with one of the side plates removed to disclose the interior of the tire. Fig. 2 is a cross section through the tire and a pair of the spring-supporting brackets. Fig. 3 is a perspective view of one of the spring-supporting brackets and Fig. 4 is a similar view of another of the supporting brackets.

Referring to the drawings, 1 indicates the inner rim having the outwardly extending side flanges 2 and of such size as to nicely fit the felly of an ordinary standard size wheel, said rim being secured to the felly (not shown) by any known means, such, for instance, as the well known wedges which would enable the rim to be taken off the wheel very quickly.

3 is the outer rim of larger diameter, but preferably about the same width and having the inwardly extending continuous side flanges 4. It will thus be seen that the rims 1 and 3 are U-shaped in cross section at any point therearound and consequently are very easily and cheaply produced. It should be mentioned that the flanges 2 and 4 extend toward each other only a sufficient distance to allow of a fair amount of movement of one rim in relation to the other in the plane of the wheel, and the space between the two rims is covered in by opposite side plates 5 and 6 carried by the outer rim 3 and having sliding abutment with the flanges 2.

The side plates 5 and 6 are rigidly secured to the rim 3, against the flanges 4 thereof, through the medium of cross bolts 7 extending through the flanges of the said rim 3 from side to side. These side plates 5 and 6 each extend a little beyond the rim 3 as indicated by the numeral 8 in order to provide a channel within which is disposed a rubber tread 9.

10 are spring-supporting brackets arranged, in the angles formed by the flanges 4 and the rim 3, at intervals therearound and staggered from side to side, that is to say, each bracket on one side of the rim comes between two brackets on the other side. In Fig. 2, one of such brackets 10 appears on one side of the rim, but it will be understood from the foregoing description that such brackets are arranged on both sides of the rim in alternate arrangement and in the angles formed by the flanges 4. These brackets 10 are each formed with a depending tongue 11 and a base portion 12 secured to the rim 3 and flange 4 by the rivets 13, and that portion of the base extending between the rim and flange is preferably arranged diagonally as shown in order to provide a strut giving additional strength to the rim.

Each of the tongues 11 is provided with a pair of holes 14 and 15 engaged by a hook 16. This hook has a threaded shank portion 17 extending through the hole 14 and provided with a tightening nut 18, while the head portion of the hook is provided with a shoulder 19 and looped around therefrom until its free end 20 engages the hole 15. It should be mentioned that the hooks 16 in the normal position of the wheel lie approximately midway between the rims 1 and 3.

21 are brackets secured to the rim in the angles formed by the flanges 2, these brackets being arranged on both sides of the rim in alternate arrangement so that each bracket 21 on one side of the rim comes opposite one of the brackets 10 on the other side of the rim 3. The brackets 21 are each secured to the flange 2 and the rim by rivets 22 and are further strengthened across the angle by the provision of a web or strut 23, and, outward of the flange, each of the said brackets 21 is extended to a point approximately midway between the two rims to form a tongue terminating in the integral hook 24.

Now, it will be seen that every hook 16 comes horizontally opposite one of the hooks 24 and between each of these pairs of said hooks, a coiled spring 25 is stretched, the looped ends 26 of said spring engaging the hooks as clearly seen in Fig. 2. Thus, there are a series of springs extending transversely of the tire at intervals therearound and intermediate between the rims 1 and 3. It will now be seen that the rim 1 is free to move toward or away from the rim 3 at any point against the resistance of the springs 25 which, being moved laterally, stretch, thus giving the necessary resilience to the wheel. During the movement of the rim 1 in relation to the rim 3, the plates 5 and 6 move with the rim 3 and slide alongside the flanges 2, which latter assist in guiding the plates in their movement and in forming such rigid support as is required when the wheel skids or slides as a whole laterally.

It will be noticed that the hooks 24 are rigid while the hooks 16 are adjustable and this is a feature which greatly helps in the assembling of the tire, particularly as each spring is slightly stretched in the fixed position. After hooking the spring on the rigid hook, the adjustable hook can be moved in a longitudinal direction to stretch the spring by simply tightening up the nut 17.

Attention is called to the fact that the tire according to the invention can be very quickly applied to the felly of an ordinary automobile or other wheel, and further that in the tire according to the invention, special attention has been given to the details of construction in order to provide great strength to contend with skidding movements of the wheel. Furthermore, with the springs arranged parallel with the axis of the wheel, it will be noticed that all the springs are stretched to a corresponding extent when relative movement takes place between the inner and outer rims and during this movement, the hooks 24 and 16 accommodate the swinging of the spring in any direction.

It is obvious that by means of a device of this character advantage is taken of the channel bar type of structure which gives a high rigidity for the amount of material used. These channel members may be made relatively weak as they are not designed primarily to withstand any severe strains. Tension of the springs is transmitted through the relatively heavy brackets directly to the web portion of the channel members. As these web portions are reinforced in the case of the outer rim by the resilient tread members and in the case of the inner rim by the felly of the wheel, there is no particular necessity for using heavy metal in the channel members.

There is a further saving of material in the construction of the side plates. Normally these plates act merely to inclose the space between the rims and as the tension of the springs is not transmitted through the side plates, they may be constructed of thin sheet metal. Further it is noted that the channel members need not be of the same thickness of material for the inner rim is not as much subjected to twisting strain as the outer rim and therefore may be made of thinner stock than that used for the outer rim.

What I claim is:

1. In a device of the class described, an inner rim adapted to be attached to a wheel and having outwardly extending continuous opposite side flanges, an outer rim surrounding and of larger diameter than the inner rim and having continuous inwardly extending opposite side flanges, an inwardly extending angle bracket with one side engaging the web of said outer rim, rivets for fastening said bracket to said web, an outwardly extending bracket rigidly secured to the inner rim and cushioning means for holding said rims in operative relation, said means including a transversely disposed coil spring stretched between said brackets.

2. In a device of the class described, an inner rim adapted to be attached to a wheel and having outwardly extending continuous opposite side flanges, an outer rim surrounding and of larger diameter than the inner rim and having continuous inwardly extending opposite side flanges, an inwardly extending bracket rigidly secured to said outer rim in the angle formed by its flanges, an outwardly extending bracket rigidly secured to the inner rim in the angle formed by its flanges and oppositely disposed traversely of the tire from said first named brackets, and cushioning means for holding said rims in operative relationship, said means including a transversely disposed coiled spring stretched between said brackets.

3. In a device of the class described, an inner rim adapted to be attached to a wheel and an outer rim surrounding and of larger diameter than the inner rim, an inwardly extending bracket having a broad base portion rigidly secured to said outer rim, an holding said rims in operative relationship, outwardly extending bracket having a broad base portion rigidly secured to the inner rim and cushioning means for holding said rims resiliently relative to each other, said means including a transversely disposed coil spring stretched between said brackets.

4. A tire comprising a pair of rims concentrically arranged, the inner rim designed to fit the felly of a wheel, means for demountably securing the inner rim to the felly, a plurality of angle brackets secured in pairs to the inner and outer rims respectively with the angle of the brackets facing inward and springs stretched between the brackets of each pair and positioned to extend in a direction parallel with the axis of the wheel.

5. A tire comprising a pair of rims concentrically arranged, side plates to inclose the space between the rims, cushioning means for holding the rims in operative relationship, said means including a bracket secured to the outer rim and a bracket secured to the inner rim, a hook carried by one of the brackets, and a plurality of springs connecting the rims, one of said springs being stretched between the brackets with one end of the spring engaging said hook so that the spring may be easily attached or detached.

6. A tire comprising a pair of channel shaped rims concentrically disposed with the channels facing each other, brackets positioned in the angles formed by the flanges of the rims thereby to strengthen the rims, with one of the brackets affixed to the outer rim and another affixed to the inner rim, and means for connecting the rims, said means including a transversely disposed spring with opposite ends attached respectively to the bracket fixed to the outer rim and to the bracket fixed to the inner rim.

7. A tire comprising a pair of concentrically disposed rims, a bracket affixed to the inner rim and another bracket affixed to the outer rim, means for connecting the rims, said means including a transversely disposed spring stretched between the brackets and means accessible through the side opening between the inner and outer rims for adjusting the tension of said spring.

8. A tire comprising a pair of concentrically disposed rims, a bracket affixed to the inner rim and another bracket affixed to the outer rim, means for connecting the rims, said means including a transversely disposed spring stretched between the brackets, means accessible through the side opening between the inner and outer rims for adjusting the tension of said spring and side plates for inclosing said springs, brackets and adjusting means.

9. A device of the class described, comprising a pair of concentrically disposed spaced apart channel bars, side plates on opposite sides of said bars coacting therewith to form a hollow rim, brackets extending from the web portions of each bar and spaced from the side plates, and means for connecting the rims, said means including a transversely disposed spring having opposite ends attached to said brackets and acting thereon to transmit strain on one of the bars directly to the other bar without passing through said side plates.

10. A device of the class described, comprising a pair of concentrically disposed rims, one of said rims being U shaped with the channel facing the other rim, said U shaped rim being of heavier stock than the other rim, a bracket positioned in one of the angles formed by the flanges of said U shaped rim to strengthen the same and transversely disposed means connecting said rims.

11. A device of the class described, comprising a pair of concentrically disposed channel shaped rims with the channels facing each other, brackets attached to the web portions of each rim and extending toward the other rim, said brackets being offset transversely from each other and overlapping, a transversely disposed spring stretched between each pair of the brackets and side plates fixed to one of the rims and in sliding engagement with the other rim for inclosing the spring and brackets.

12. In a quick detachable elastic tire, an inner rim having outwardly extending continuous opposite side flanges, an outer rim surrounding and of larger diameter than the inner rim and having continuous inwardly extending opposite side flanges, a pair of side plates adapted to close the space between said outer and inner rims and having sliding abutment with the flanges of said inner rim, inwardly extending brackets rigidly secured to said outer rim in the angles formed by its flanges, said brackets being on both sides of the rim and in alternate arrangement and each having a base extending diagonally across the angle and terminating in a tongue portion with a pair of holes therein, a hook having a threaded shank and engaging one of said holes and having a head portion bent over to engage the other hole, a nut on said shank for clamping the hook to the tongue, outwardly extending brackets rigidly secured to the inner rim in the angles formed by its flanges, and arranged on both sides of the inner rim in alternate arrangement and each terminating in a tongue bent to form an integral hook, and a coil spring stretched between each inner and outer rim bracket and having looped ends engaging the hooks of said brackets.

13. In a device of the class described, an inner wheel band designed to be attached to the wheel, an outer tread band encircling the inner band, an angle bracket affixed to one of said bands with a member thereof extending toward the other band and extending transversely of the band toward the medial plane through the tire thereby to transmit strains toward the center of the tire and means for holding the bands relative to each other, said means including a transversely disposed coiled spring having one end pivoted to the bracket and the other end pivoted to said other band.

14. In a device of the class described, an inner wheel band designed to be attached to the wheel, an outer tread band encircling the inner band, an angle bracket having a broad flat base flange, a plurality of spaced apart fastening means for affixing said base to one of said bands thereby to resist twisting of the same, said bracket including a post projecting from said base flange toward the other band and means for connecting the bands resiliently, said means including a transversely disposed spring having one end pivoted to said post and the other end pivoted to the other band.

15. In a device of the class described, an inner wheel band channel shape in cross-section, means for attaching the web of said band centrally to the felly of a wheel, an angle bracket having a base portion extending transversely of a portion of the web of the band on the side opposite the portion engaged by the wheel felly whereby strains on said bracket are transferred directly to the portion of the band reinforced by the felly and means connecting the bands, said means including a transversely extending spring placing a strain on said bracket.

16. A tire for vehicle wheels including an inner wheel band and an outer tread band, circumferentially spaced apart pairs of brackets, each pair being transversely disposed and having one bracket thereof fixed to the outer band and the other bracket fixed to the inner band, a spring extending between the members of each pair of brackets, the brackets attached to each band being staggered from side to side, whereby adjacent springs will be inclined in opposite directions to hold the bands in one plane when the bands are moved from their normal position relative to each other.

Signed at Plessisville, county of Megantic, Canada, this 11 day of September, A. D. 1915.

PIERRE ANTONIO PAINCHAUD. [L. S.]

Copies of this patent may be obtained for five cents each, by addressing the "Commissioner of Patents, Washington, D. C."